US008825222B2

(12) United States Patent
Namburu et al.

(10) Patent No.: US 8,825,222 B2
(45) Date of Patent: Sep. 2, 2014

(54) REMOTE MANAGEMENT OF VEHICLE SETTINGS (75) Inventors: Setu Madhavi Namburu, Dorchester, MA (US); Steven F. Kalik, Arlington, MA (US); Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 514 days.

(21) Appl. No.: 12/395,520

(22) Filed: Feb. 27, 2009

(65) Prior Publication Data
US 2010/0222939 A1 Sep. 2, 2010

(51) Int. Cl.
G05D 1/00 (2006.01)
G05D 3/00 (2006.01)
G06F 7/00 (2006.01)
G06F 17/00 (2006.01)

(52) U.S. Cl.
USPC .................................. 701/2; 701/1

(58) Field of Classification Search
USPC ............................................. 701/2
See application file for complete search history.

(56) References Cited

U.S. PATENT DOCUMENTS

| | | | |
|---|---|---|---|
| 4,754,255 A * | 6/1988 | Sanders et al. ............... | 307/10.4 |
| 6,144,114 A | 11/2000 | Chutorash | |
| 6,198,996 B1 * | 3/2001 | Berstis ........................... | 701/36 |
| 6,427,115 B1 | 7/2002 | Sekiyama | |
| 6,647,328 B2 | 11/2003 | Walker | |
| 6,759,943 B2 * | 7/2004 | Lucy et al. ................... | 340/5.72 |
| 6,775,603 B2 * | 8/2004 | Yester et al. .................... | 701/36 |
| 6,785,595 B2 * | 8/2004 | Kominami et al. ............. | 701/36 |
| 6,819,986 B2 * | 11/2004 | Hong et al. .................. | 701/33.4 |
| 6,853,853 B1 * | 2/2005 | Van Wiemeersch et al. ......................... | 455/569.2 |
| 6,885,285 B2 | 4/2005 | Losey | |
| 7,212,889 B2 * | 5/2007 | Mann et al. ....................... | 701/1 |
| 7,301,441 B2 * | 11/2007 | Inada et al. ............... | 340/426.13 |
| 7,379,541 B2 * | 5/2008 | Iggulden et al. ......... | 379/102.03 |
| 7,778,186 B2 * | 8/2010 | Oman et al. .................. | 340/5.61 |
| 8,346,432 B2 * | 1/2013 | Van Wiemeersch et al. ... | 701/36 |
| 2002/0007238 A1 * | 1/2002 | Moriguchi et al. ............. | 701/36 |
| 2003/0078709 A1 * | 4/2003 | Yester et al. .................... | 701/36 |
| 2004/0010358 A1 * | 1/2004 | Oesterling et al. .............. | 701/49 |
| 2004/0203379 A1 | 10/2004 | Witkowski | |
| 2006/0015221 A1 * | 1/2006 | Sarkar et al. ....................... | 701/2 |
| 2006/0122750 A1 * | 6/2006 | Choi et al. ...................... | 701/36 |
| 2006/0211446 A1 | 9/2006 | Wittmann | |
| 2007/0005206 A1 * | 1/2007 | Zhang et al. .................... | 701/36 |
| 2007/0139373 A1 | 6/2007 | Simon | |
| 2008/0061988 A1 * | 3/2008 | Mock et al. ................. | 340/573.1 |

(Continued)

Primary Examiner — Tien Dinh
Assistant Examiner — Michael A Fabula
(74) Attorney, Agent, or Firm — Christopher G. Darrow; Young Basile Hanlon & MacFarlane P.C.

(57) ABSTRACT

A method of remotely managing vehicle settings wherein the method includes receiving an identification (ID) code associated with at least one user. The method further includes corresponding the ID code to at least one user profile following verification of the ID code and executing a vehicle setting associated with the at least one user profile. An apparatus for remotely managing vehicle settings is further disclosed. The apparatus includes memory for storing at least one user profile. The apparatus further includes a processor coupled to the memory, the processor configured to receive an identification (ID) code corresponding to the at least one user profile. Furthermore, the processor is in communication with a vehicle processing system operable to execute a vehicle setting associated with the at least one user profile.

16 Claims, 6 Drawing Sheets (56) References Cited

U.S. PATENT DOCUMENTS

| | | |
|---|---|---|
| 2008/0309451 A1* | 12/2008 | Zellweger et al. ............ 340/3.32 |
| 2009/0096575 A1* | 4/2009 | Tieman ......................... 340/5.62 |
| 2009/0096596 A1* | 4/2009 | Sultan et al. .............. 340/426.13 |
| 2009/0167524 A1* | 7/2009 | Chesnutt et al. .......... 340/539.19 |
| 2009/0273438 A1* | 11/2009 | Sultan et al. ................... 340/5.7 |
| 2010/0087987 A1* | 4/2010 | Huang et al. .................... 701/36 |
| 2010/0233957 A1* | 9/2010 | Dobosz ........................ 455/41.1 |
| 2011/0071720 A1* | 3/2011 | Schondorf et al. .............. 701/30 |
| 2011/0071734 A1* | 3/2011 | Van Wiemeersch et al. ... 701/49 |

* cited by examiner

| User1 |  |
|---|---|
| Climate Control Preferences |  |
| Warm Up/Cool Down Temp. |  |
| Fan Settings for Warm Up/Cool Down |  |
| Time Period for Warm Up/Cool Down |  |
| Defrost/Defogger Settings |  |
| ⋮ |  |

*FIG. 8A*

| User1 |  |
|---|---|
| Entertainment Preferences |  |
| Preferred Station |  |
| Advertising Settings |  |
| Category Preferences |  |
| ⋮ |  |

*FIG. 8B*

| User1 |  |
|---|---|
| Navi/GPS Preferences |  |
| Preferred Location |  |
| Traffic Avoidance Settings |  |
| Route Preferences |  |
| Carpool Pickup/ Drop Off |  |
| ⋮ |  |

*FIG. 8C*

REMOTE MANAGEMENT OF VEHICLE SETTINGS

TECHNICAL FIELD

The present disclosure relates generally to the field of vehicle systems and, more specifically, to methods and systems for remote management of a vehicle.

BACKGROUND

Transportation means such as motor vehicles or automobiles may include several systems such as an engine, a suspension system, a braking system, a drive train system, a coolant system, an intake system, a fuel injection system, as well as several additional systems. Many automobiles may include one or more interfaces within their systems to allow a user to manage the operation of components in the system. For example, a central on-board console may allow a user to control an audio system, a navigation system, a climate control system, a video system, various performance modes, and/or a variety of other systems/settings in an automobile. In some automobiles, a separate interface may be provided for each system.

Utilizing a control system, a user may remotely operate certain aspects of the systems within an automobile. For example, an electronic key fob may allow a user to unlock/lock doors, lower/raise windows, open the trunk, start the engine, or the like. Some automotive manufacturers may provide control systems that provide remote operation of some of the automobile's systems. For example, automotive manufacturers may provide a communication link (e.g., Lexus Link or GM OnStar) from the vehicle to a remote operator which may unlock/lock doors, determine the location of the vehicle, detect if the airbag has been deployed or the like.

Additionally, some automotive control systems may also provide diagnostic information regarding the vehicle. For example, many vehicles may include instrumentation such as, but not limited to, oil temperature gauges, speedometers, battery gauges, fuel gauges, and engine revolutions per minutes (RPM) gauges Further, several sensors may be present in a vehicle, such as $O_2$ sensors and mass air flow (MAF) sensors, which may provide diagnostic data to the processors in the various automotive systems. In some cases, an automotive manufacturer may provide systems to allow a technician to connect a diagnostic device to a vehicle to diagnose the automotive systems utilizing the sensors in the vehicle. Further, the diagnostic device may allow a technician to view data regarding an engine's temperature, oil temperature, tire pressure, or other vehicle properties. In one implementation, a vehicle may wirelessly communicate diagnostic data to an operator at a remote location, and the diagnostic data may serve to inform the operator or other parties regarding the conditions of the vehicle. In the event of an automobile collision, for example, the operator may be notified when an airbag is deployed.

However, in most vehicles, remote operation of an automobile by an operator and diagnostic information provided to the operator may be limited. Tasks that can be performed remotely may be limited, and retrieving diagnostic data may require additional components not already included with the automobile. Further, systems that provide remote operation or diagnostic capabilities may not be expandable or they may not allow additional systems to be added. Some diagnostic systems may only provide data to third parties rather than to the operator or owner of the vehicle.

Thus a need remains for methods and systems for providing a flexible interactive interface and/or interface device that allows a user to manage the operation and view diagnostic information regarding the various systems in a vehicle. The interactive interface or interface device may be detachable from the vehicle to allow convenient and secure operation of various systems in an automobile. The interactive interface or interface device may further operate in a completely remote manner, never physically contacting the vehicle.

SUMMARY

The following presents a general summary of several aspects of the disclosure in order to provide a basic understanding of the disclosure. This summary is not an extensive overview of the disclosure nor is it intended to identify key or critical elements of the disclosure or to delineate the scope of the claims. The following summary merely presents some concepts of the disclosure in a general form as a prelude to the more detailed description that follows.

One aspect of the disclosure provides a method for managing a vehicle. The method includes receiving an identification (ID) code associated with at least one user. The method further includes corresponding the ID code to at least one user profile following verification of the ID code and executing a vehicle setting associated with the at least one user profile.

Another aspect of the disclosure provides an apparatus for remotely managing a vehicle setting. The apparatus includes memory for storing at least one user profile and a processor coupled to the memory. The processor is configured to receive an identification (ID) code corresponding to the at least one user profile and the processor is in communication with a vehicle processing system operable to execute a vehicle setting associated with the at least one user profile.

Yet another aspect of the disclosure provides a vehicle information system including a remote device, a vehicle processing system, and a learning element. The remote device is operable to verify an identification (ID) code with at least one user and wherein the remote device comprises a processor and memory for storing at least one user profiler corresponding to the at least one user. The vehicle processing system may be in communication with the processor of the remote device, wherein the vehicle processing system is operable to execute a vehicle setting associated with the at least one user profile. Further, a learning element is operable to automatically modify the at least one user profile with a condition preference when a pattern associated with a condition is sensed.

BRIEF DESCRIPTION OF THE DRAWINGS

For simplicity and clarity of illustration, the drawing and/or figures illustrate the general manner of construction, and descriptions and details of well known features and techniques may be omitted to avoid unnecessarily obscuring the disclosure. For detailed understanding of the present disclosure, references should be made to the following detailed description of the several aspects, taken in conjunction with the accompanying drawings, in which like elements have been given like numerals and wherein.

DETAILED DESCRIPTION

Before the present methods and systems are described, it is to be understood that this disclosure is not limited to the particular methods and system described, as such may vary. One of ordinary skill in the art should understand that the terminology used herein is for the purpose of describing possible aspects, embodiments and/or implementations only, and is not intended to limit the scope of the present disclosure which will be limited only by the appended claims. For example, to one of ordinary skill in the art, it will be readily apparent that a vehicle may be implemented in a variety of ways such as a motor vehicle, automobile, or the like, utilizing different engines, suspension systems, braking systems, drive train systems, coolant systems, intake systems, fuel injection systems, or any suitable variety of components, and that the forgoing discussion of certain of these implementations does not necessarily represent a complete description of all possible implementations.

This disclosure is not limited in its application to the details of construction and the arrangement of components set forth in the following description or illustrated in the drawings. The disclosure is capable of other embodiments, implementations or aspects and of being practiced or of being carried out in various ways. Also, the use of "including," "comprising," "having," "containing," "involving," "consisting" and variations thereof, is meant to encompass the items listed thereafter and equivalents thereof as well as additional items.

It must also be noted that as used herein and in the appended claims, the singular forms "a," "and," and "the" may include plural referents unless the context clearly dictates otherwise. Thus, for example, reference to "a system" refers to one or several systems, and reference to "a method of forming" includes reference to equivalent steps and methods known to those skilled in the art, and so forth.

Figure 1:
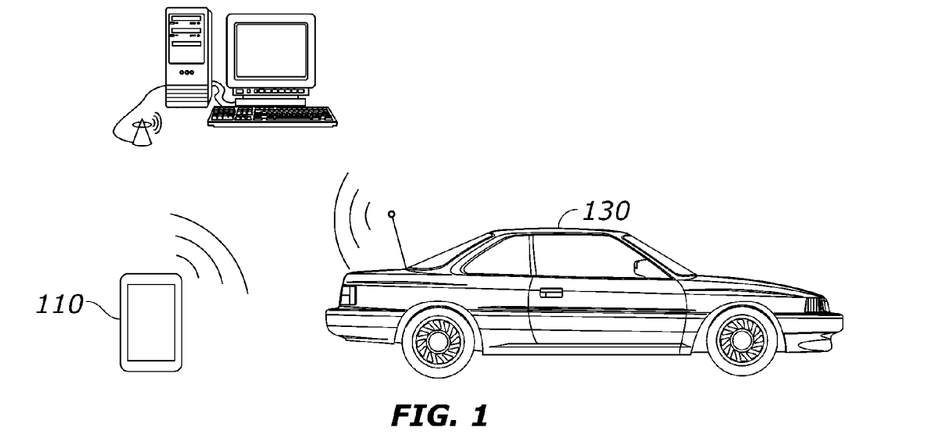
FIG. 1 represents an illustrative implementation of a vehicle and remote devices.

FIG. 1 provides an illustrative implementation of a vehicle 130 and remote devices including a remote console 110 and/or remote server 120. A remote device may be any suitable interface device providing an interactive interface to allow a user to manage the operation and view diagnostic information regarding various systems in the vehicle 130. To this end, a remote device may be any instrumentality or aggregate of instrumentalities in communication with the vehicle 130 whereby the remote device is operable to receive, original, compute, classify, process, transmit, retrieve, store, display, manifest, detect, record, reproduce, handle, or utilize any form of information, intelligence, or data related to systems/operations of a vehicle such as an automobile or the like.

For example, a remote device may be a remote server 120 or any conventional computer or network system as will be familiar to one of skill in the art. The remote server 120 may include various elements such as memory (e.g., random access memory (RAM), read-only memory (ROM)), one or more processing resources such as a central processing unit (CPU), network ports for communicating with external devices, input and output (I/O) devices (e.g., a keyboard, a mouse, a video display), or the like. Moreover, the remote server 120 may include one or more buses operable to transmit data communications between the various elements.

As another example of a remote device, a remote console 110 may be in communication with or coupled to a vehicle 130. The remote console 110 may be communicatively coupled to a vehicle processing system (not shown) residing within the vehicle 130, and the vehicle 130 may also provide a docking station or the like to serve as a place of attachment for the remote console 110. The remote console 110 may wirelessly communicate with the vehicle processing system utilizing RF signals, Bluetooth, or via any applicable type of signal or other suitable method including routing signals through the remote server 120.

The remote console 110 and/or remote server 120 may receive an identification (ID) code allowing verification of a user's authority to operate systems in the vehicle 130. Verification of a user may occur when a match exists between an ID code received and a stored ID code corresponding to a particular user. Sources including biometrics, such as voice or face recognition, a radio frequency identification (RFID) tag, a user entered code, or any suitable security method may generate an ID code to be received/recognized by the remote console 110 or remote server 120. Other examples include a smart card, an electronic key fob, an electronic key, a magnetic stripe card, a user entered code or a mechanical lock and key mechanism to generate an ID code for the remote device. Once the ID code received by the remote console 110 or remote server 120 is verified, the user may view or manage systems in the vehicle 130.

In addition to the ID code, the remote device may transmit user profile data to the vehicle. User profile data may include any information/data related to the vehicle or vehicle system(s) associated with an individual user or vehicle occupant. By way of example, a driver may create a user profile to store all vehicle settings and data related to any vehicle system corresponding specifically to the driver, including vehicle settings preferred by the driver. The driver's user profile may then be stored and executed separately from a user profile corresponding to a front passenger, for example. Each individual may be assigned a separate ID code, or in the case of biometrics, each individual may be sensed differently by the remote console 110, thereby allowing the selection of a particular user profile matching the individual.

The remote device may be upgradeable or expandable allowing more functionality to be added depending on the user's knowledge or preferences. For example, novice users may need or prefer a simplified version, whereas experienced users may retrieve more advanced features such as vehicle information, process diagnostic data and implement system/vehicle health checks, software updates, advanced data-processing, or many additional operations provided by the system.

According to an implementation of the present disclosure, the vehicle 130 may communicate with the remote server 120 directly without communication via the remote console 110. Should there be any operational failure of the remote console 110, a user may access the remote server 120 (e.g., via a web console) and information stored thereon to remotely manage vehicle operations.

In an implementation in which a remote console 110 is utilized with an identifying (ID) token, the vehicle 130, via a vehicle processing system (described below), and the remote console 110 may communicate user profile data, settings, security data, feedback data, diagnostic data, and any other suitable data to one another. As previously mentioned, the remote console 110 may communicate directly with the vehicle 130 or via a remote server 120. For example, the vehicle 130 may provide feedback data to the remote console 110 indicating that the internal temperature of the vehicle 130 has reached a desired temperature. As used herein, an "identifying token" or "ID token" may refer to any security device that provides a security or identification (ID) code and/or user profile to a remote console 110 or vehicle to verify a user's authority to access the vehicle. The ID token 420 may be a key fob, an electronic key, a smart card, an ID card, or any other suitable portable security device capable of providing data to a remote console 110 or vehicle.

Figure 2A:
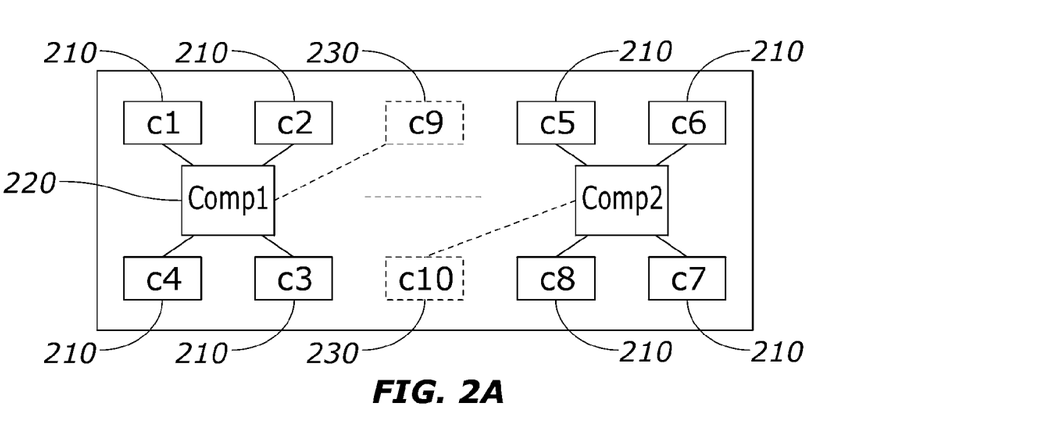
FIG. 2A represents a first illustrative implementation of vehicle's processing system.

FIG. 2A represents a first illustrative implementation of vehicle's processing system. Generally, a vehicle processing system may be located on the interior front dash or any suitable location within the vehicle and may include a microprocessor or the like to manage the receiving, handling, storing, calculating, manipulating, or sending of information to/from the remote device. The vehicle processing system, coupled to the vehicle, may further be coupled to and may execute operation of at least one vehicle system. To that end, the vehicle processing system may receive from the remote console 110 or remote server 120 or provide the vehicle settings/preferences which corresponds to the operation of the vehicle and associated vehicle system(s). Examples of a vehicle system include, but are not limited to, an engine controller, a climate control system, an integrated cellular phone system, a sound system (radio), a global positioning system (GPS) receiver, and a video entertainment center (such as a DVD player). Moreover, examples of vehicle settings may include, but are not limited to, engine oil pressure, engine coolant temperature, battery voltage, vehicle maintenance reminders, climate control system settings, outside temperature, radio settings, integrated cellular phone settings, compass headings, video images, sound files, digital radio broadcasts, and navigational information.

A vehicle system may include at least one or several components 210 to perform a specified function for the vehicle. As one example of a vehicle system, an exhaust system may include one or more components such as exhaust manifolds, catalytic converters, mufflers, sensors and the like. The components 210 of a system may be coupled to a processor 220 to analyze performance data including any data related to or generated by a vehicle system. For instance, an exhaust system may provide a sensor to measure the percentage of gas (e.g., emissions related gas, carbon dioxide) in the exhaust. The performance data, such as level of carbon dioxide, for example, may be utilized for diagnostics and/or adjustment of the vehicle's systems. The performance data may also be stored so that a user or a third party may analyze the performance data at a later time. In the implementation shown, two or more processors 220 may be present, and each processor 220 may be coupled to a single or multiple components 210 in the vehicle. The processors 220 may also be coupled to one another to allow data communication between the processors. For example, a first processor retrieving performance data from an exhaust system may provide the performance data to a second processor managing a fuel injection system. A vehicle may also allow upgrades 230 to be added during the life of the vehicle. An example of an upgrade 230 may be a navigational system or audio/video equipment that is added to or modified on a vehicle sometime after the purchase of the vehicle.

Figure 2B:
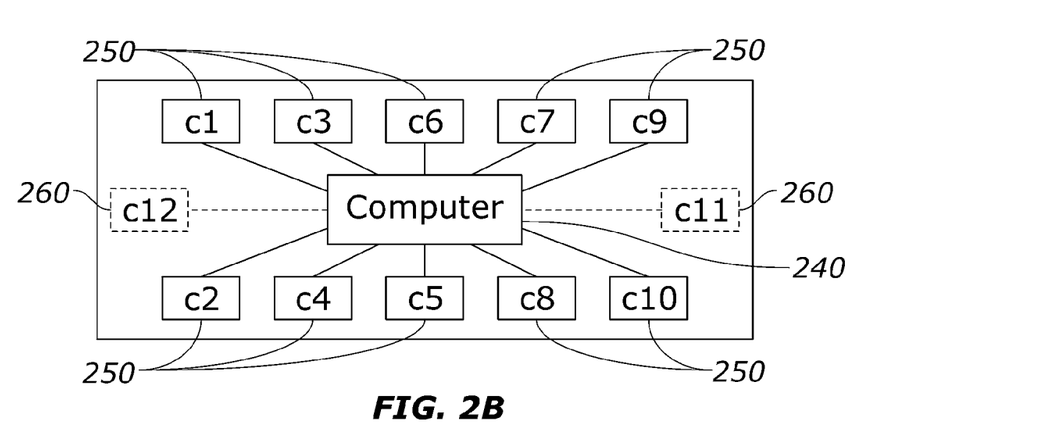
FIG. 2B represents a second illustrative implementation of a vehicle's processing system.

FIG. 2B represents a second illustrative implementation of a vehicle's processing system. In another implementation of a vehicle's processing system, a central processor 240 may be coupled to multiple components 250 in the vehicle. By providing a single central processor 240, communication of diagnostic data may be simplified. The processing system may also allow upgrades 260 to be added at a later time.

Figure 2C:
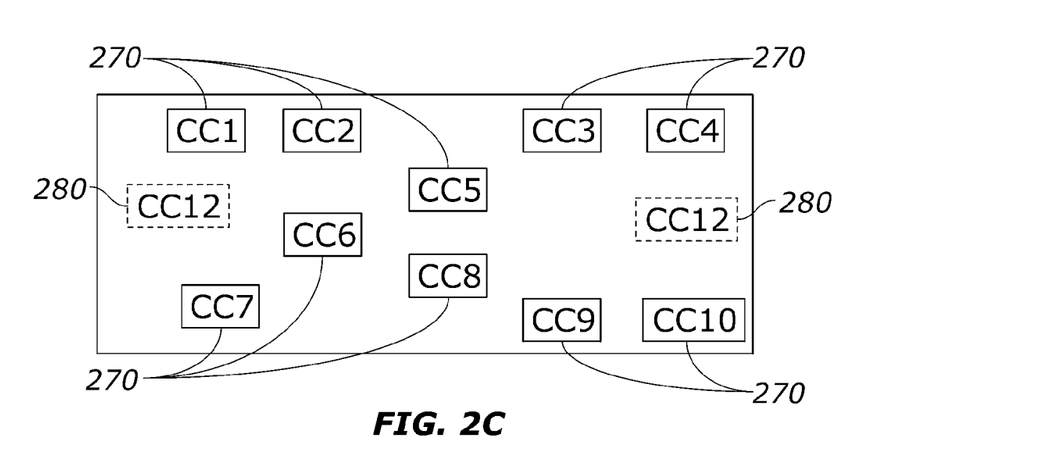
FIG. 2C represents a third illustrative implementation of a vehicle's processing system.

FIG. 2C represents a third illustrative implementation of a vehicle's processing system. In the present implementation of a vehicle's processing system, each component may also include a processor 270. For instance, an oxygen sensor for an exhaust system may also include its own dedicated processor. Since the dedicated processor may be performing simple operations, the processor 270 may be a less powerful than the processors discussed in the previous implementations. Each component may include a processor whereby multiple processors may be communicatively coupled to one another to allow data communication between the processors. As in the previous implementations, the vehicle's processing system is expandable and may allow upgrades 280 to be added to the processing system. These distributed components may be permanently or detachably coupled to each other communicatively, using wireless communications or other shared and exclusive access media communication environments as will be familiar to those skilled in the arts of communication systems design and development.

Figure 3:
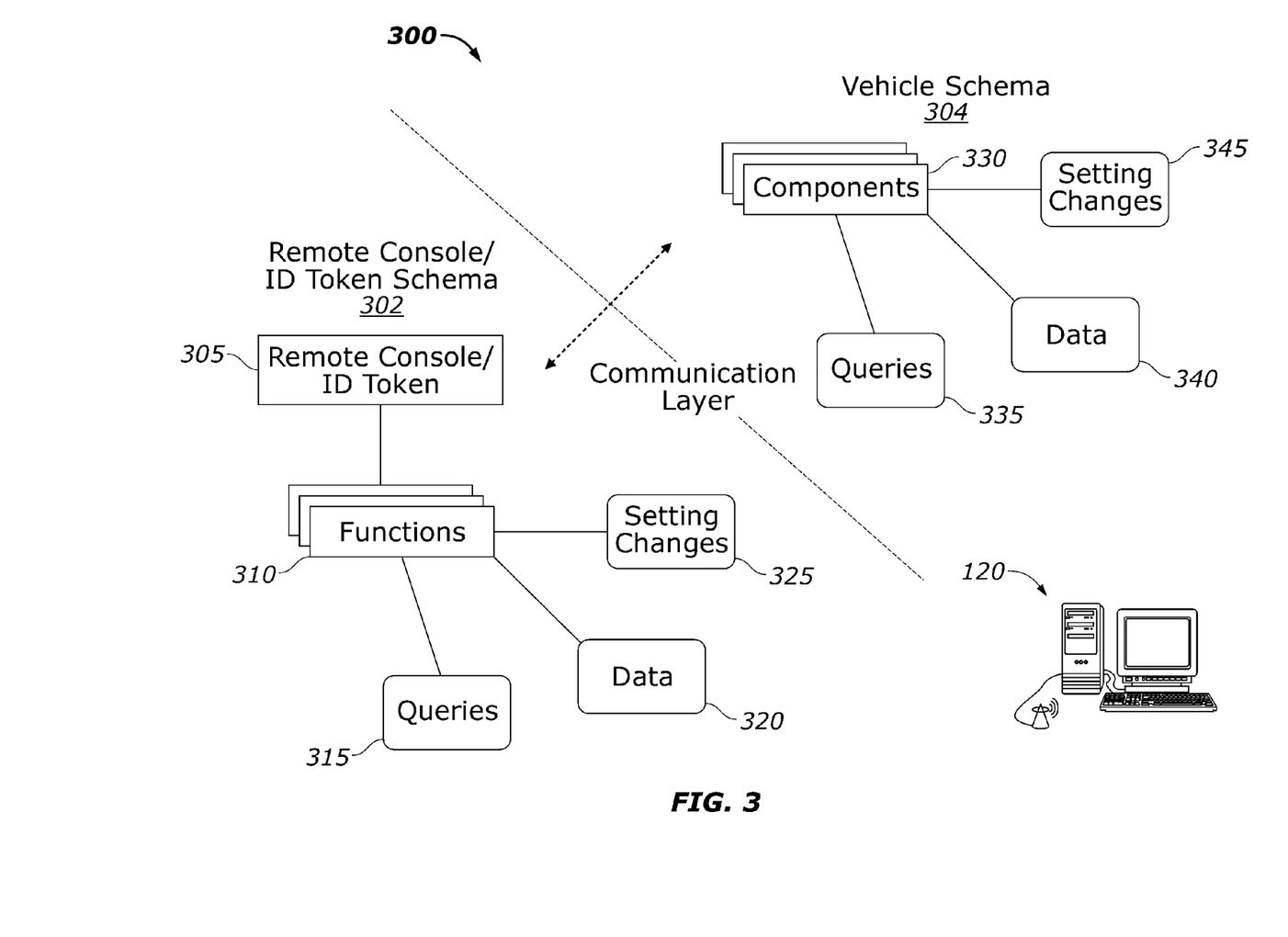
FIG. 3 represents an illustrative implementation of a remote console/identifying (ID) token and vehicle schema.

FIG. 3 provides an illustrative implementation of a combined remote console/ID token and vehicle schema, indicated generally at 300. The remote console/ID token schema 302 may include a remote console/ID token 305. The remote console/ID token 305 may provide several functions 310 that may be performed remotely including, but not limited to, performing queries 315, sending or receiving data 320, changing settings 325, and any other suitable functions. The remote console/ID token 305 may communicate with the vehicle through any conventional communication layer, with or without remote server 120 directly involved in the communication. As part of the vehicle schema 304, components 330 may receive communications from the remote console/ID token 305. Once the communications are received, the components 330 may implement the functions provided, such as performing queries 335, requesting data 340, and changing settings 345.

Figure 4:
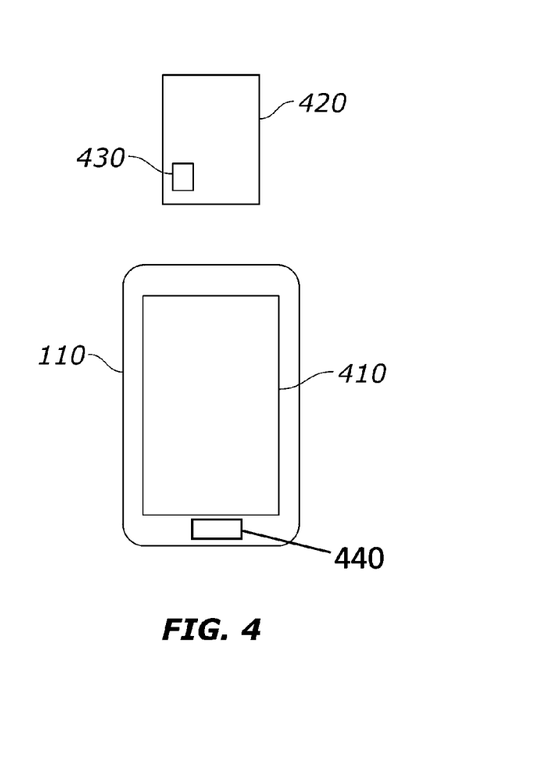
FIG. 4 represents an illustrative implementation of a remote console and identifying (ID) token.

FIG. 4 provides an illustrative implementation of a remote console 110 and an identifying (ID) token 420. The remote console 110 may be a cellular phone, a personal digital assistant (PDA), a portable navigation device, or any other suitable handheld device that may remotely and securely manage operations of a vehicle. A remote console 110 may include a display 410 for viewing various inputs/outputs such as an ID code, vehicle settings (to be described below), or any information inputted by or outputted to a user. Examples of a display 410 may include a liquid crystal display (LCD), a touch screen, or any suitable display. The remote console 110 may provide a keypad (not shown), trackwheel, or any input mechanism to allow a user to input data or make selections. In addition, the remote console 110 may also provide a touch screen display allowing a user to enter inputs by contacting the screen with a pen, stylus or the like. In one implementation, a touch screen display 410 may obviate the need for a keypad, which may allow the keypad to be removed from the remote console 110. The display 410 may provide a plurality of input menus allowing a user to communicate data to and from the remote console 110 to the vehicle.

The remote console 110 may be operable to receive or coupled with an identifying (ID) token 420 which may include a security device 430, such as a smart chip. The security device 430 may provide an ID code when the identifying token is coupled to or inserted into the remote console 110 to verify a user's authority to operate the vehicle. While the security device 430 in the implementation shown may be a smart chip, the security device 430 may be implemented in a variety of mechanical or electrical ways, including, but not limited to, a key, a barcode, a scan code, a magnetic strip, a RFID tag, or any other suitable security device. When the ID token 420 is inserted into, connected to, coupled with, or otherwise in communication with, a remote console 110, the security data may be read from the ID token 420. The ID token 420 may also be coupled to the remote console 110 through a card slot allowing a smart chip, a barcode, a scan code, or a magnetic strip or other electrical contact to be read. In some implementations, the security data may be wirelessly provided by the ID token 420. In yet other implementations, a traditional mechanical mechanism, such as a physically shaped key, could also provide security verification, acting as the security device 430 integrating into ID token 420. Alternatively, a mechanical key and lock tumbler mechanism could be integrated directly into remote console 110. Such a mechanical key and lock tumbler mechanism may include an electrically interpreted mechanical structure such as a mechanical key that can be inserted into a receptacle or locking tumbler device whose final physical shape provides the ID code.

It is understood that while an ID token 420 is shown in FIG. 4, a remote console 110 may be operable without an ID token 420. For example, the remote console 110 may provide a keypad for entering a code or a biometric detection device such as a fingerprint reader. In this event, the remote console 110 may provide security features such as biometrics (e.g., voice/face/fingerprint recognition), a user entered code, or any other suitable means of security to generate a security code. Other suitable means of security may include iris recognition, genetic sequencing or any method of identification from the encoding of biological and/or chemical properties of individuals.

The remote console 110 may further comprise a processor (not shown) to handle and/or process data related to the remote operation of the vehicle. The processor may comprise a microprocessor, minicomputer, or any other suitable device, including combinations and/or a plurality thereof, for executing instructions related to the handling of data such as, but not limited to, user profiles, preference database, or vehicle settings, as described herein.

The remote console 110 may further comprise memory (not shown) which may be utilized to store any information related to the operation of a vehicle including vehicle settings/preferences, user profiles or the like. The memory 530 may be any existing type of memory such as a memory card or the like.

Based on parameters, instructions, algorithms, programs, or the like, the processor may output data via the display 410. The display 410 may allow a user to view user profiles, vehicle settings, as well as other data.

A remote console 110 may provide secure, personalized access to a vehicle's systems via a remote interface, such as via a remote server as previously mentioned. The remote console 110 may provide a user with the ability to remotely and securely manage operation(s) of various systems of the vehicle. Remote operations performed from the remote console 110 may include, but are not limited to, (1) secure tool access and activation (e.g., via login prompt and password protection, potentially matching info on the ID token 420), (2) remote starting of a vehicle, (3) secure vehicle door/trunk lock/unlock, (4) vehicle diagnostic health check, (5) vehicle status report including a fuel reading, an odometer reading, and other standard dashboard features, (6) navigation system, climate control system, and multimedia system review including the ability to set a variety of options for the various systems, (6) user profile creation for each user providing personalized settings for the vehicle, (7) remotely updating vehicle software, (8) enabling/disabling available vehicle utilities (e.g., child lock, disabling/enabling door lock, granting limited access to users or vehicle spaces as in a "valet access key" limiting access to trunk/ glove compartments, or other private personalized functions of the vehicle), (9) system feedback from the vehicle, and (10) scheduled alarms regarding maintenance and service.

The features provided by the remote console 110 may also be upgradeable or expandable. More functionality can be added depending on the user's knowledge or requirements. For example, a novice user may prefer a simple version that provides limited commands and data retrieval, whereas experienced users may want to retrieve vehicle information and process the information. Experienced users may also wish to perform a health check report, connect to the vehicle's processing system perform software updates, execute advanced data-processing, and complete other advanced tasks.

Figure 5:
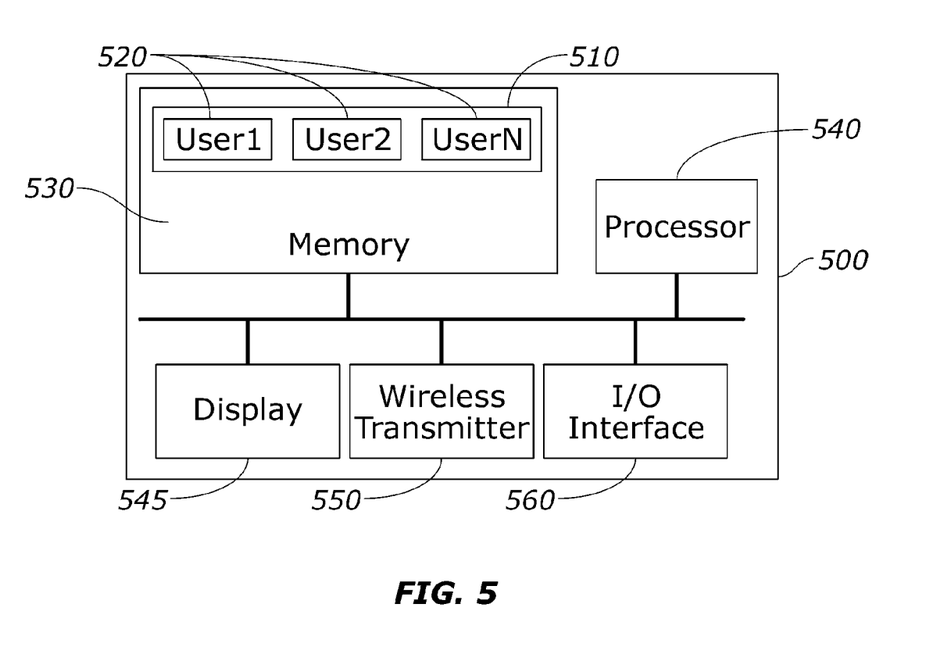
FIG. 5 represents an illustrative implementation of a preference database device.

FIG. 5 represents an illustrative implementation of a preference database device, indicated generally at 500. A preference database 510 may be present on preference database device 500 which may be included in a remote console or on a vehicle, shown in FIG. 1 as 130. For example, the preference database 510 may be stored on remote console, such as a cell phone, a personal digital assistant (PDA), a handheld, an accessory, or any suitable portable device. Examples of an accessory which may serve as a remote console include a watch, a bracelet, or the like. A remote console may further contain an optical projective element and a receiver to identify locations indicated in the context of an image projected on the optical projective element. The preference database 510 may be stored by components of the vehicle, such as a hard drive of an in-dash console or any other suitable component.

A preference database 510 may include a single or multiple user profiles 520 corresponding to a single or multiple drivers/passengers of a vehicle. A user profile 520 may include several setting preferences for a particular user regarding various systems in a vehicle. For example, a user profile may store a particular user's settings or vehicle settings for climate control, an audio system, a global positioning system (GPS) or navigation system, a motor performance setting, an occupant accommodation setting, communication setting, or the like.

Exemplary occupant accommodation settings may include a mirror setting, a seat heater setting, a seat position setting, an airbag activation setting, or the like. For example, a mirror setting may include information related to the position of any mirror of the vehicle, including the rear view mirror and side mirror(s) on either side of the exterior of the vehicle. As another example of possible occupant accommodation settings, various seat positions including movement of the front row seat(s) in a vehicle length direction, seat height position, reclining angle position or the like may be stored within a user profile. Seat heater setting such as high, medium, low may also be associated with each occupant in any seat position in the vehicle. Further, an airbag activation setting may be set as a default to deploy upon impact experienced by the vehicle or may be set to off in a case when airbag deployment is not desired.

A user profile may further store a user's settings related to motor performance. Examples of motor performance settings may include, but are not limited to, ride and suspension setting, maintenance setting, a vehicle state display setting. In an example of a maintenance setting, a user may designate a warning for a needed oil change based on a particular mileage increment while another user may designate the same service based on time such as everyone 6 months. Further, a vehicle state display setting may include gasoline level, engine temperature or the like.

Further still, a user profile may contain information regarding possible communication settings including intravehicle communication settings, inter-vehicle communication settings, vehicle-to-environment communication settings, remote communication settings, communications to a remote center, and any other setting(s) that could exist on vehicle systems or that could be communicated with by vehicle systems or subsystems Memory 530 may be utilized to store the preference database 510 and user profiles 520. For example, memory storing GPS data or MP3 files may be utilized to store the preference database. The memory 530 may be any existing type of memory such as a memory card or the like, operable to store the preference database 510 and/or the user profiles 520.

A processor 540 may be coupled to the memory 530 and may process data as needed to perform a specific task. The processor 540 may comprise a microprocessor, minicomputer, or any other suitable device, including combinations and/or a plurality thereof, for executing instructions related to the handling of data such as, but not limited to, user profiles 520, preference database 510, or vehicle settings such as the aforementioned.

Based on parameters, instructions, algorithms, programs, or the like, the processor 540 may output data via an optional display 545. The optional display 545 may allow a user to view user profiles 520, vehicle settings such as the aforementioned, as well as other data.

The preference database device 500 may optionally include a wireless transmitter 550 or transceiver allowing data to be wirelessly transmitted and received. When the preference database device 500 is a remote console, the remote console may transmit user profile data, vehicle settings, setting changes, and any other suitable data to the vehicle. When the preference database device 500 is a vehicle, the vehicle may receive or transmit commands, diagnostic data, and other information from/to the identifying token or remote console. One or more input/output (I/O) interfaces 560 may also be present to allow the remote console 500 to be coupled to or in communication with other devices or systems. For example, an I/O interface 560 may provide an interface for the preference database device 500 to receive/send data from a smart card. In one implementation of a preference database device 500, a display 545 or wireless transceiver 550 may not be present. For example, an existing display or wireless transceiver in a vehicle or a handheld may be coupled to an I/O interface 560 to provide the same functionality as the display 545 or wireless transceiver 550.

Figure 6:
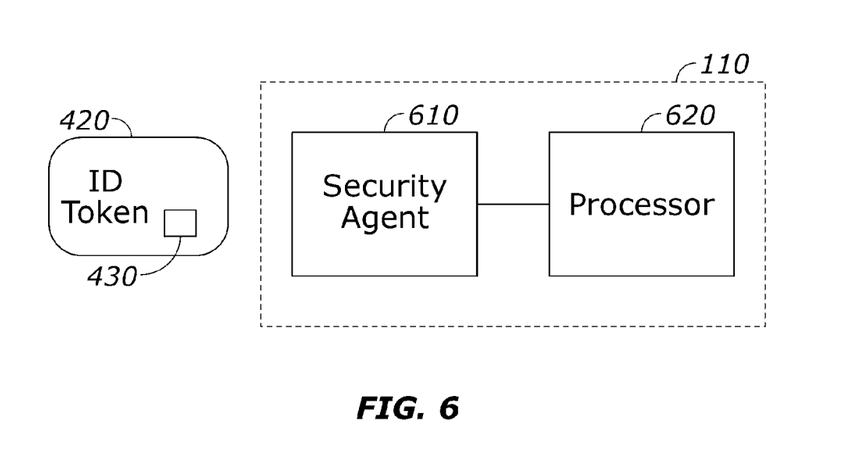
FIG. 6 represents an illustrative implementation of an on-token user profile system.

FIG. 6 provides an illustrative implementation of an on-token user profile system. In one implementation, an ID token 420, such as a smart card, an electronic key, an electronic key fob, or an RFID tag, may store a user profile. The ID token 420 may provide limited storage capacity which, in some cases, may only allow a single user profile and some additional data to be stored. An ID token 420 may also be inserted into or communicatively coupled to a remote console 110 to verify a user. Additionally, when the ID token 420 is coupled to a remote console 110, a full range of operations may be performed. The ID token 420 may provide an ID code from a security device 430 to a security agent 610 to enable the security agent 610 to verify that the user has authority to operate the vehicle. Once the user is verified, a user profile may be provided to a processor 620.

Figure 7:
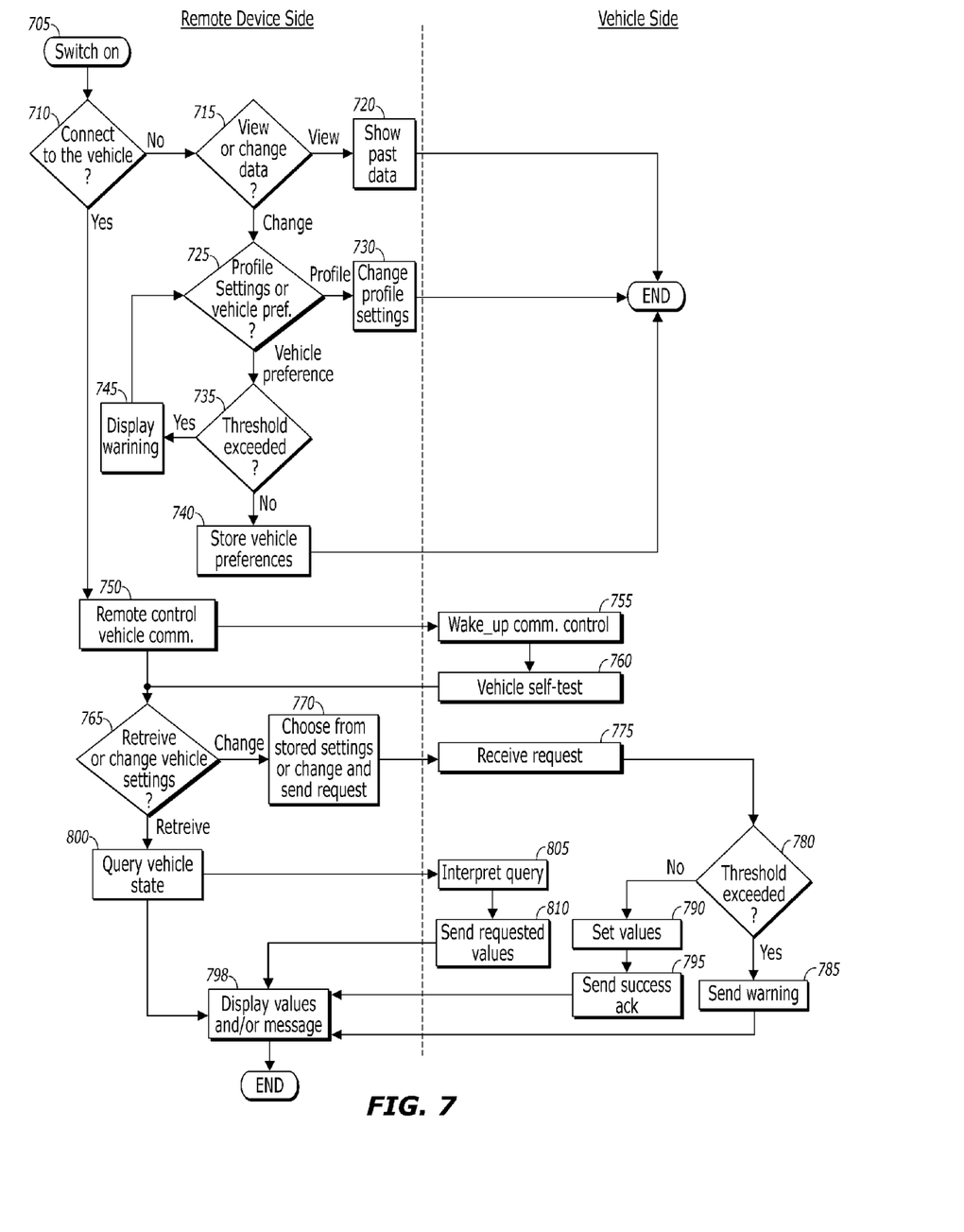
FIG. 7 provides a system flow diagram of a method for remotely managing a vehicle in accordance with one aspect of the present disclosure.

FIG. 7 provides an illustrative implementation of one possible system flow diagram of a method for remotely managing a vehicle with a remote device. While the illustrative implementation provides a flow diagram for systems with a remote console and vehicle, the flow diagram may also represent the flow of other systems discussed herein (e.g., ID token/vehicle, identifying token/remote console/vehicle, etc.). Other flows may also be appropriate, for example, such as an event driven version of the interface, as are familiar to those skilled in the art of interface design. Any suitable software interface may be utilized to implement any detachable remote hardware component (i.e., console) containing memory to permit multiple user profiles and vehicle settings (e.g., past or current states) to be stored for review and modification even when not in communication with the vehicle.

With regard to the flow diagram shown in FIG. 7, a user may initialize the remote device, such as by switching on the remote console or launching the remote server interface in step 705. The user may login to the remote console or remote server interface with a username and/or password to validate the privilege to access the information available on or from the particular remote device. If the user is successfully validated, the remote device may then prompt a user to either connect to the vehicle or just work with the remote device. If user chooses not to connect to the vehicle, the remote device may prompt the user to view or change data such as vehicle settings (e.g., temperature setting) in step 715. In the event the user elects to view data, the remote device may provide past data, such as vehicle settings, previously stored in the remote console in step 720. An election to change data by the user may cause the remote device to prompt the user to select either personal profile settings or vehicle preferences in step 725. A personal profile setting may refer to any user profile detail (e.g., age, gender, etc.), sub-user profile creation, individual vehicle setting limit (e.g., audio volume, speed, etc.), sub-user (i.e., family member under a parental setting, or a fleet member under a fleet owner setting, etc.) vehicle setting or any suitable vehicle setting limits other than the manufacturer's recommended levels which can be stored in the console. For example, a user may set the vehicle interior temperature to not exceed 70 degrees Celsius, a seat position to not exceed a predetermined position, or a sound system volume to not exceed a predetermined volume such as a level 8 of a maximum level 10.

Alternatively, a vehicle preference may refer to required settings such as temperature, audio volume, seat configuration, or the like, associated with a single or multiple user profile(s) which may be selected by a user for current or future trips. If the user selects a vehicle preference in step 725, he/she is prompted to change vehicle settings such as temperature, seat position, and the like. These vehicle preferences are checked against the setting thresholds (e.g., user specified or manufacturer specified limits). If a vehicle preference exceeds the setting threshold, the method in FIG. 7 will return back to step 725. If the setting threshold limits are not met, the vehicle preference may then be stored in the remote device for future use.

In addition to security data and other user information, a vehicle preference may include data indicating setting preferences for several systems in a vehicle. For example, a user profile may include vehicle preferences for climate control, entertainment, navigation/GPS, seat/mirror settings and any other suitable vehicle preference. The vehicle preferences discussed herein are in no way limited to the particular implementations provided. It is recognized by one of ordinary skill in the art that numerous automotive systems may be present in a vehicle and preferences and/or settings for any of the automotive systems may be stored in a user profile.

If vehicle preference is selected in step 725, it is then determined whether the setting threshold for the vehicle preference has been exceeded by the updated setting(s) provided by the user, as shown in step 735. Setting threshold values or vehicle preference values for vehicle settings may be stored in the remote device in various suitable forms such as by way of look-up tables, as one example. In the event the user inputs a value that exceeds a vehicle preference, a warning can be issued directly from the software in the remote device without requiring contact with the vehicle in step 745. In another implementation, a warning may be issued directly from the software in the remote device when a sub-user (e.g., child, passenger) requests to exceed a setting threshold value specified by an authority or administrative user (e.g., parent, fleet-owner). In the case when the setting threshold for the vehicle preference has not been exceeded by the updated setting(s) provided by the user, the vehicle preference is then implemented and stored in the remote device.

Returning now to step 710 in FIG. 7, if user chooses to connect to the vehicle, communication between the remote device and vehicle may then occur. In step 750, communication with the vehicle may be initiated by the remote device while concurrently a wake-up command may be received by a communication device on the vehicle side. To this end, a communication device within the vehicle may test its connectivity and/or communication with the remote device. The vehicle may then perform a self test in step 760 or any suitable determination of connectivity between the remote device and vehicle. Once the vehicle has completed the self test, the remote device may be notified and the vehicle may wait for a next command.

Once the remote device receives notice of the conclusion of the vehicle self test, step 765 occurs whereby the remote device may determine if a change to the current vehicle setting(s) is/are necessary based on the current vehicle preference in the remote device, or the vehicle setting(s) will need to be retrieved/changed based on the user's input and prompt the user accordingly. If user chooses to change a particular vehicle setting, step 770 may occur when the user selects the vehicle setting from possible setting(s) stored in the remote device. Alternatively, a user may change a particular vehicle setting to any suitable value and send a request to make the change which is received at a vehicle in step 775.

Subsequently in step 780, it is determined whether performance threshold level(s) have been exceeded. In the present step, exemplary performance threshold levels may pertain to suspension system limits, weather conditions at various destinations, vehicle service reminders and the like. To determine these performance thresholds, information from the running vehicle is required to implement the users' request. For example, a fuel injection or throttle setting may be set to achieve a "sport mode" set-up for the engine, which may differ from one altitude to another, and may even be unreachable in a particular environmental condition. In the event the vehicle setting request inputted by a user exceeds the corresponding performance threshold, a warning may be generated in step 785. As another possible example, if a user sets the remote device to provide vehicle service reminders every fifty thousand miles, the vehicle may provide a warning that the manufacturer suggests that the vehicle be serviced every thirty thousand miles. Alternatively, should a request inputted by a user not exceed the performance threshold level, the remote device may set and store the inputted request in step 790 and send an acknowledgement that settings/requests have been successfully updated in step 795. Similarly, in the example previously provided, if a user sets the remote device to provide vehicle service reminders every ten thousand miles while the manufacturer suggests that the vehicle be serviced every thirty thousand miles, the remote device will set and store the ten thousand mile value inputted by the user.

If the vehicle settings are to be retrieved in 765, the remote device may then query the vehicle for a current state in step 800. Examples of vehicle states may include oil level, fuel level, outdoor temperature and the like. In step 805, the vehicle may receive a query, and the vehicle may respond to the query by sending the requested data to the remote device in step 810. Subsequently, the remote device may display the value(s) from the vehicle or alternatively, a message (e.g., warning, request for query) in step 798.

Figure 8A:
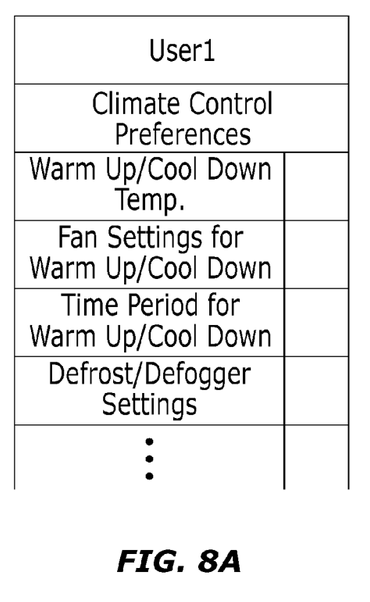
FIG. 8A represents an illustrative implementation of a user's climate control preferences.

FIG. 8A provides an illustrative implementation of a user's climate control preferences, as an example of a vehicle setting. Climate control preferences may include warm up/cool down temperature, air circulation in/out, fan settings for warm up/cool down, a warm up/cool down time, external conditions, defrost/defogger settings and the like. The warm up/cool down temperature may indicate a user's preferred temperature for the interior of a vehicle. The fan settings for warm up/cool down may indicate the preferred fan power (e.g., Hi, Low, Medium, etc.) for warm up/cool down. The warm up/cool down time may indicate the amount of time that a user would like the climate control system to spend warming up or cooling down the interior of the vehicle. The external condition preferences may indicate when a user wishes to change climate control preferences based on external conditions such as weather and temperature outside the vehicle, for example. For example, a user's climate control preferences may be influenced by whether it is warm or cold, sunny or dark, rainy, foggy, or any other environmental condition. A user may set the air conditioning on during the summer, the heater on during the winter, the headlights on when it is rainy or dark, defogger on when it is foggy, or the like. Utilizing sensors detecting external temperature, sunlight, and other environmental conditions, the external condition preferences may provide the basis for a user's preferred settings for different environmental conditions. By way of example, the defrost/defogger settings may indicate a user's preferred defrosting or defogging time. Based on the climate control preferences, the remote device may warm up, defrost, and control other climate control settings for the user.

Figure 8B:
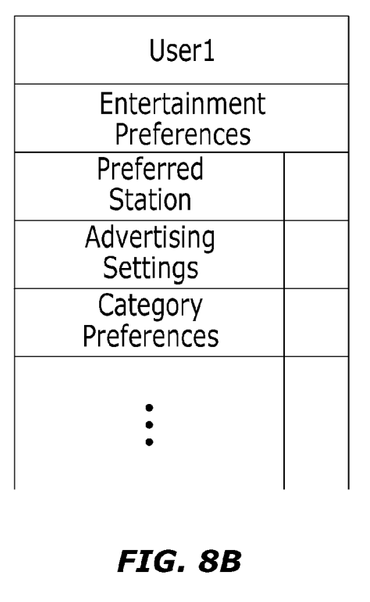
FIG. 8B represents an illustrative implementation of a user's entertainment preferences.

FIG. 8B provides an illustrative implementation of a user's entertainment preferences, as another example of a vehicle setting. A user's entertainment preferences may include preferred settings for audio and video systems in a vehicle. An audio system may include an AM/FM radio or a satellite radio, a MP3 player, an optical disc player, and any other suitable audio devices. The entertainment preferences may contain a user's preferred stations, advertising settings, category preferences, volume preferences, or any other suitable information. Furthermore, preferred stations may include several AM, FM, and/or satellite radio stations. The advertising settings may indicate whether a user prefers to avoid commercials or remain on the same station during commercial play. When the user wants to avoid commercials, the audio system may automatically tune to another preferred station when a commercial is detected.

In one possible implementation, a learning element may be installed in the console whereby a learned model of the difference between the station's typical programming and the station's typical commercials would allow detection of a commercial. When the commercial is detected, a controller may select a different station from a set of preset preferred stations, or via other "seek" or random selection methods as will be familiar to those skilled in the art of audio entertainment system interface design. Category preferences may indicate a user's preferred types of music. For example, a user may select one or more preferred categories of music, such as rock, pop, country, rap, R&B, classical, etc. The volume preferences may indicate a preferred starting volume, volume range, or the like.

Entertainment preferences may also include preferences for additional audio devices, such as a MP3 player, CD player, or CD changer. These entertainment preferences may include playback preferences, album or track preferences, playlists, category preferences, or any other suitable preferences. Playback preferences may indicate if a user prefers a normal mode, a shuffle/random mode, or the like. Album or track preferences may indicate if a user likes or dislikes an album or track. A playlist may include one or more preferred tracks on a MP3 player or optical disc player. Category preferences may indicate a preferred type of music, such as rock, pop, country, rap, R&B, classical, etc.

Figure 8C:
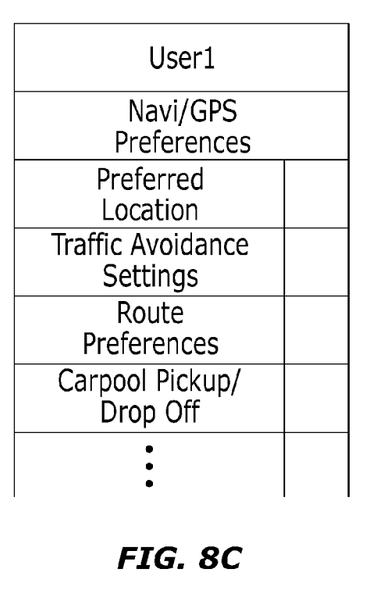
FIG. 8C represents an illustrative implementation of a user's navigation/global positioning system (GPS) preferences.

FIG. 8C provides an illustrative implementation of a user's navigation/GPS preferences, as another example of a vehicle setting. Navigation/GPS preferences may include preferred locations, traffic avoidance settings, common errands, route preferences, carpool pickup/drop-off locations, and/or any other suitable navigation preferences. Preferred locations may include locations that are input manually, or that are visited frequently, such as the user's home, office, favorite restaurants, or the like. Traffic avoidance may indicate if a user prefers the shortest route or the shortest driving time. Common errands may store the location of places where common errands may be performed, such as gas stations, grocery stores, and restaurants. Route preferences may indicate a preferred or avoided highway, road, or street. Carpool pickup/drop off may indicate locations for a user's carpool pickup or drop-off location.

A remote device or vehicle processing system may allow manual entry of user profile preferences and in some cases, based on changing conditions interior or exterior to a vehicle, the settings for a user profile may be adjusted accordingly. A learning element 440 can be incorporated into the remote device, for example into the remote console 110 shown in FIG. 4, and/or incorporated into the vehicle processing system to modify a user profile, vehicle setting, user setting/preference or determine alternative vehicle settings/preferences or user settings based on patterns associated with the conditions. The learning element 440 may perform a periodic review (e.g., daily, weekly, etc.) of a user profile, vehicle setting, and/or user setting/preference. Based on the review of the aforementioned and/or conditions interior or exterior to the vehicle, patterns associated with the conditions may be detected and a user profile may be modified to incorporate those preferred settings accordingly. Examples of conditions may include, but are not limited to, temperature, weather, terrain (i.e., road condition) or other factors affecting driver performance, occupant comfort or the like.

Modifications in the form of condition preferences (e.g., interior condition preferences, exterior condition preferences) may be made to a user profiled based on patterns such as repeated conditions, repeated changes to conditions, fluctuations in conditions, or the like. As used herein, a "repeated change" may refer to more than one change to the vehicle setting(s) within a particular duration, such as during the course of one day or one trip within the vehicle. Further, the user profile may be modified automatically, i.e., without user intervention, when patterns occur within conditions related to the interior/exterior of the vehicle. For example, the learning element 440 may determine that the heater is turned on every time the interior temperature of the vehicle drops below 60° F. As a result, the learning element 440 may store data in the user's profile indicating that the heater should be turned on whenever the interior temperature drops below 60° F. As an example of an external condition preference, a learning element 440 may determine that the air conditioner should be automatically turned on the 68° F. when the temperature external to the vehicle exceeds a predetermined level, such as greater than 95° F. This determination may be based on a pattern or repeated change noted in interior or exterior vehicle temperatures.

The learning element 440 may be stored in the remote device in the form of parameters, instructions, algorithms, programs, codes, or the like. As such, the learning element 440 is operable perform functions such as, but not limited to, receiving, handling, computing, processing, storing, or transmitting any form of information related to a vehicle setting/preference, user settings/profile or the like.

In other situations, detected condition preferences may require common or anticipated setting changes. Common or anticipated setting changes may be changes that the user is anticipated to make in certain conditions. Common or anticipated setting changes may not require the detection of repeated behavior for the learning element 440 to provide vehicle settings. For instance, when rain is detected on the windshield of the vehicle, the windshield wipers are activated.

The learning element 440 may also create sub-classes for a user profile and allow the user to label the sub-class. Utilizing the tools discussed above, a learning element 440 may create sub-classes based on certain conditions. For example, the learning element 440 may detect the presence of a child seat and the address of a school entered in the navigation system at a similar time for several days. The learning element 440 may create a sub-class for such conditions, and the user may label the sub-profile "driving kids to school". User profile sub-classes may also be created by the user or the learning element 440 for particular situations in which the user's preferences differ from normal settings. For instance, the sub-classes may include seasonal conditions (e.g., winter, summer, spring, fall), outdoor conditions (e.g., rainy, sunny, windy, etc.), events (e.g., road trip, sports events, etc.), number of passengers and type of passengers, and any other sub-classes created by user.

Methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media, having computer-executable instructions, may be handled, read, sensed and/or interpreted by any suitable machine such as a computer, electronic device, vehicle, or other suitable apparatus containing a processor. Generally, computer-executable instructions, such as program modules, may include routines, programs, objects, components, data structures, and the like, which perform particular tasks, carry out particular methods or implement particular abstract data types. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, and/or use of equivalent functional junctions for couplings/links described herein.

What is claimed is:

1. A method of remotely managing vehicle settings, the method comprising:
   receiving at a remote device, an identification (ID) code associated with at least one user;
   corresponding, at the remote device, the ID code to at least one user profile including at least one vehicle setting following verification of the ID code;
   receiving at the remote device, information related to managing the at least one vehicle setting associated with the at least one user profile;
   communicating the information related to managing the at least one vehicle setting from the remote device to a vehicle processing system configured to execute the at least one vehicle setting associated with the at least one user profile;
   communicating the information related to managing the at least one vehicle setting from the remote device to a learning element;
   wherein the learning element is configured to associate the information related to managing the at least one vehicle setting with at least one condition interior to or exterior to a vehicle including the vehicle processing system;
   wherein the learning element is configured to modify the at least one user profile based on a pattern of associating the information related to managing the at least one vehicle setting with the at least one condition interior to or exterior to the vehicle;
   wherein the learning element is configured to create at least one sub-class for the at least one user profile based on at least one condition interior to or exterior to the vehicle;
   wherein the learning element is configured to allow the at least one user to label the sub-class; and
   wherein the at least one sub-class includes at least one vehicle setting different than a vehicle setting associated with the at least one user profile.

2. The method of claim 1, wherein the remote device receives the ID code from an identifying (ID) token and the ID token includes one of a smart card, an electronic key fob, an electronic key, biometrics, a magnetic stripe card, a radio frequency identification (RFID) tag, a barcode, user entered code, or a mechanical key and lock mechanism.

3. The method of claim 1, wherein the remote device comprises a remote server, a remote console, or a combination thereof.

4. The method of claim 3, wherein the remote device comprises a combination of the remote server and the remote console and the vehicle processing system is in communication with the remote server and the remote server is in communication with the remote console.

5. The method of claim 1, wherein the at least one vehicle setting is selected from a climate setting, an audio system setting, a global positioning system (GPS) setting, a motor performance setting, a communication setting, or an occupant accommodation setting.

6. The method of claim 5, wherein the at least one vehicle setting is a motor performance setting and the motor performance setting is selected from a ride and suspension setting, a maintenance setting, or a vehicle state display setting.

7. The method of claim 5, wherein the at least one vehicle setting is an occupant accommodation setting and the occupant accommodation setting is selected from a minor setting, a seat heater setting, a seat position setting or an airbag activation setting.

8. The method of claim 1 further comprising:
   determining, at the remote device, a threshold for the at least one vehicle setting, wherein the threshold comprises a setting threshold or performance threshold;
   receiving, at the remote device, a vehicle preference or personal profile setting; and
   storing, at the remote device, the vehicle preference or personal profile setting when the vehicle setting does not exceed the threshold.

9. An apparatus comprising:
   a memory storing at least one user profile;
   a processor coupled to the memory, the processor programmed to perform the steps of:
   receiving an identification (ID) code corresponding to the at least one user profile;
   communicating with a vehicle processing system installed in a vehicle, the vehicle processing system programmed to execute a vehicle setting associated with the at least one user profile; and
   a learning element, the learning element programmed to perform the steps of:
   associating the vehicle setting associated with the at least one user profile with at least one condition interior to or exterior to the vehicle;
   creating at least one sub-class for the at least one user profile based on at least one condition interior to or exterior to the vehicle; and
   allowing the at least one user to label the sub-class;
   wherein the at least one sub-class includes at least one vehicle setting different than a vehicle setting associated with the at least one user profile.

10. The apparatus of claim 9 wherein the processor is further programmed to receive the ID code from an identifying (ID) token and wherein the ID token includes one of a smart card, an electronic key fob, an electronic key, biometrics, a magnetic stripe card, a radio frequency identification (RFID) tag, a barcode, user entered code, or a mechanical key and lock mechanism.

11. The apparatus of claim 9, wherein the vehicle setting is selected from a climate setting, an audio system setting, a global positioning system (GPS) setting, a motor performance setting, or an occupant accommodation setting.

12. The apparatus of claim 11, wherein the at least one vehicle setting is a motor performance setting and the motor performance setting is selected from a ride and suspension setting, a maintenance setting, or a vehicle state display setting.

13. The apparatus of claim 11, wherein the at least one vehicle setting is an occupant accommodation setting and the occupant accommodation setting is selected from a minor setting, a seat heater setting, a seat position setting or an airbag activation setting.

14. The apparatus of claim 9, wherein the learning element is further programmed to modify the at least one user profile based on a pattern of associating the vehicle setting with the at least one condition interior or exterior to the vehicle.

15. A vehicle processing system comprising:

a processor programmed to perform the steps of:

communicating with a remote device to verify an identification (ID) code associated with at least one user profile, the remote device comprising a processor and memory for storing at least one user profile corresponding to the at least one user;

executing a vehicle setting associated with the at least one user profile; and communicating with a learning element programmed to perform the steps of:

automatically modifying the at least one user profile when a pattern of executing a vehicle setting is associated with a condition interior to or exterior to a vehicle including the vehicle processing system;

creating at least one sub-class for the at least one user profile based on at least one condition interior to or exterior to the vehicle; and allowing the at least one user to label the sub-class;

wherein the at least one sub-class includes at least one vehicle setting different than a vehicle setting associated with the at least one user profile.

16. The system of claim 15, wherein the vehicle setting is selected from a climate setting, an audio system setting, a global positioning system (GPS) setting, a motor performance setting, a communication setting, or an occupant accommodation setting.

* * * * *

UNITED STATES PATENT AND TRADEMARK OFFICE
CERTIFICATE OF CORRECTION

PATENT NO. : 8,825,222 B2  
APPLICATION NO. : 12/395520  
DATED : September 2, 2014  
INVENTOR(S) : Setu Madhavi Namburu, Steven F. Kalik and Danil V. Prokhorov It is certified that error appears in the above-identified patent and that said Letters Patent is hereby corrected as shown below:

In the Specification

In column 2, line 51, please delete "drawing" and replace with --drawings--;
In column 2, line 55, please delete "For detailed" and replace with --For a detailed--;
In column 2, line 62, please delete "implementation of" and replace with --implementation of a--;
In column 7, line 55, please delete "530";
In column 8, line 65, please delete "heater setting" and replace with --heater settings--;
In column 9, line 7, please delete "setting, a vehicle" and replace with --setting, and a vehicle--;
In column 9, line 11, please delete "everyone" and replace with --every--;
In column 9, line 21, please delete "subsystems" and replace with --subsystems.--;
In column 11, line 27, please delete "device." and replace with --device at step 740.--;
In column 11, line 33, please delete "side." and replace with --side at step 755.--;

In the Claims

In column 15, line 21, please delete "receiving at" and replace with --receiving, at--;
In column 16, line 7, please delete "minor" and replace with --mirror--;
In column 16, line 61, please delete "minor" and replace with --mirror--.

Signed and Sealed this  
Tenth Day of February, 2015

Michelle K. Lee  
*Deputy Director of the United States Patent and Trademark Office*